US009961283B2

United States Patent
Kolb et al.

(10) Patent No.: US 9,961,283 B2
(45) Date of Patent: May 1, 2018

(54) COLOR RECONSTRUCTION

(71) Applicant: Essential Products, Inc., Palo Alto, CA (US)

(72) Inventors: Michael Kolb, Redwood City, CA (US); Andrew E. Rubin, Los Altos, CA (US); Matthew Hershenson, Los Altos, CA (US); Rebecca Schultz Zavin, Portola Valley, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days. days.

(21) Appl. No.: 15/284,042

(22) Filed: Oct. 3, 2016

(65) Prior Publication Data
US 2018/0070033 A1    Mar. 8, 2018

Related U.S. Application Data

(60) Provisional application No. 62/384,322, filed on Sep. 7, 2016.

(51) Int. Cl.
*H04N 9/64*  (2006.01)
*H04N 5/228*  (2006.01)
(Continued)

(52) U.S. Cl.
CPC ........... *H04N 5/3572* (2013.01); *G06T 3/005* (2013.01); *G06T 3/0056* (2013.01);
(Continued)

(58) Field of Classification Search
CPC .... H04N 9/07; H04N 5/23238; H04N 5/3696; H04N 5/3572; G06T 3/005;
(Continued)

(56) References Cited

U.S. PATENT DOCUMENTS

2005/0141047 A1*  6/2005  Watanabe .............. H04N 9/045
                                                        358/471
2007/0127837 A1*  6/2007  Ishii ........................ G06K 9/38
                                                        382/270
(Continued)

OTHER PUBLICATIONS

Notice of Allowance dated Jul. 6, 2017, for U.S. Appl. No. 15/284,031 of Kolb, M. et al., filed Oct. 3, 2016.
(Continued)

*Primary Examiner* — Lin Ye
*Assistant Examiner* — John H Morehead, III
(74) *Attorney, Agent, or Firm* — Perkins Coie LLP

(57) ABSTRACT

In one embodiment, coloring artifacts of a color image output by a camera are minimized by taking into account a distortion introduced by the lens. Based on the distortion, the color reconstruction determines which pixels in the grayscale image to include in the reconstruction process. Additionally, the color reconstruction can take into account edges depicted in the grayscale image to determine which pixels to include in the reconstruction process. In another embodiment, coloring artifacts in a 360 degree color image are minimized by performing the color reconstruction process on a three-dimensional surface. Before the color reconstruction takes place, the two-dimensional grayscale image is projected onto a three-dimensional surface, and the color reconstruction is performed on the three-dimensional surface. The color reconstruction on the three-dimensional surface can take into account the distortion produced by the lens and/or can take into account the edges depicted in the two-dimensional and three-dimensional grayscale image.

30 Claims, 10 Drawing Sheets

(51) Int. Cl.
    *H04N 9/73*     (2006.01)
    *H04N 5/357*     (2011.01)
    *G06T 3/00*     (2006.01)
    *G06T 7/00*     (2017.01)
    *H04N 5/232*     (2006.01)
    *H04N 5/369*     (2011.01)
    *H04N 9/07*     (2006.01)
    *H04N 5/202*     (2006.01)

(52) U.S. Cl.
    CPC ....... *G06T 7/0085* (2013.01); *H04N 5/23238* (2013.01); *H04N 5/3696* (2013.01); *H04N 9/07* (2013.01); *G06T 2207/10024* (2013.01); *G06T 2207/20048* (2013.01); *G06T 2207/20182* (2013.01)

(58) Field of Classification Search
    CPC ................. G06T 3/0056; G06T 7/0085; G06T 2207/20182; G06T 2207/10024; G06T 2207/20048
    See application file for complete search history.

(56) References Cited

U.S. PATENT DOCUMENTS

| | | | | |
|---|---|---|---|---|
| 2008/0095455 A1* | 4/2008 | Hosaki | ...................... | H04N 1/41 382/248 |
| 2011/0148908 A1* | 6/2011 | Jeong | ...................... | G09G 5/02 345/590 |
| 2011/0176726 A1* | 7/2011 | Lee | ...................... | H04N 1/40012 382/163 |
| 2011/0211752 A1* | 9/2011 | Grafulla-Gonzalez | | H04N 9/045 382/162 |
| 2012/0148100 A1* | 6/2012 | Kotake | .................. | G06T 7/0046 382/103 |
| 2012/0200755 A1* | 8/2012 | Nagata | ................... | H04N 9/045 348/302 |
| 2013/0315489 A1* | 11/2013 | Uchiyama | ............. | G06T 7/0085 382/199 |
| 2014/0267351 A1* | 9/2014 | Klaus | ........................ | G09G 5/02 345/589 |
| 2015/0077584 A1* | 3/2015 | Kunieda | .............. | G03B 21/147 348/222.1 |
| 2015/0092992 A1* | 4/2015 | Ishihara | ............. | H04N 5/23212 382/106 |
| 2015/0363904 A1* | 12/2015 | Arai | ........................ | G06T 5/003 382/131 |
| 2015/0375445 A1* | 12/2015 | Grundhofer | ............ | B29C 51/46 700/98 |

OTHER PUBLICATIONS

International Search Report and Written Opinion dated Sep. 14, 2017 for PCT Application No. PT/US17/48124 filed Aug. 23, 2017.
Non-Final Office Action dated Dec. 30, 2016 for U.S. Appl. No. 15/284,031 of Kolb et al., filed Oct. 3, 2016.

* cited by examiner

COLOR RECONSTRUCTION

CROSS-REFERENCE TO RELATED APPLICATION

This application incorporates by reference U.S. Provisional Patent Application No. 62/384,322, filed on Sep. 7, 2016, which is incorporated by reference herein in its entirety.

TECHNICAL FIELD

The present application is related to an imaging device and, more specifically, to methods and systems that improve color reconstruction associated with an image recorded by the imaging device.

BACKGROUND

Most modern digital cameras acquire images using a pixel sensor overlaid with a color filter array to produce a grayscale image and a color filter array image. Each pixel in the grayscale image corresponds to one colored filter in the color filter array image. For example, when the colored filter is red, the colored filter allows only red light to reach a pixel of the pixel sensor placed beneath the red colored filter. As a result, the pixel of the pixel sensor only records a light intensity of red light. The pixel lacks information regarding other colors such as blue, green, etc. As a result, the grayscale image recorded by the pixel sensor includes many gaps corresponding to light filtered by the color filter array. A processor associated with a digital camera reconstructs the missing color across the pixels in the grayscale image to produce a color image. The color reconstruction process is error-prone due to various factors, such as lens distortion. The resulting color image thus contains coloring artifacts.

SUMMARY

Introduced here are methods and systems to minimize the coloring artifacts associated with an output color image. In modern digital cameras, the output color image is produced by reconstructing color from a grayscale image and a color designation associated with each pixel in the grayscale image. Each pixel in the grayscale corresponds to a single color, and lacks information regarding the rest of the colors. The missing colors are reconstructed by a processor connected to the camera. However, this process is error-prone due to various factors, such as lens distortion. The resulting color image thus contains coloring artifacts.

In one embodiment, the technology disclosed herein minimizes coloring artifacts by taking into account a distortion introduced by the lens. Based on the distortion introduced by the lens, the color reconstruction determines which pixels in the grayscale image to include in the reconstruction process. Additionally, the color reconstruction can take into account edges depicted in the grayscale image to determine which pixels to include in the reconstruction process.

In another embodiment, the technology disclosed herein minimizes coloring artifacts in a 360 degree color image by performing the color reconstruction process on a three-dimensional surface. Before the color reconstruction takes place, the two-dimensional grayscale image is projected onto a three-dimensional surface, and the color reconstruction is performed on the three-dimensional surface. The color reconstruction on the three-dimensional surface can take into account the distortion produced by the lens and/or can take into account the edges depicted in the two-dimensional and three-dimensional grayscale image.

BRIEF DESCRIPTION OF THE DRAWINGS

These and other objects, features, and characteristics of the present embodiments will become more apparent to those skilled in the art from a study of the following detailed description in conjunction with the appended claims and drawings, all of which form a part of this specification. While the accompanying drawings include illustrations of various embodiments, the drawings are not intended to limit the claimed subject matter.

DETAILED DESCRIPTION

Terminology

Figure 1:
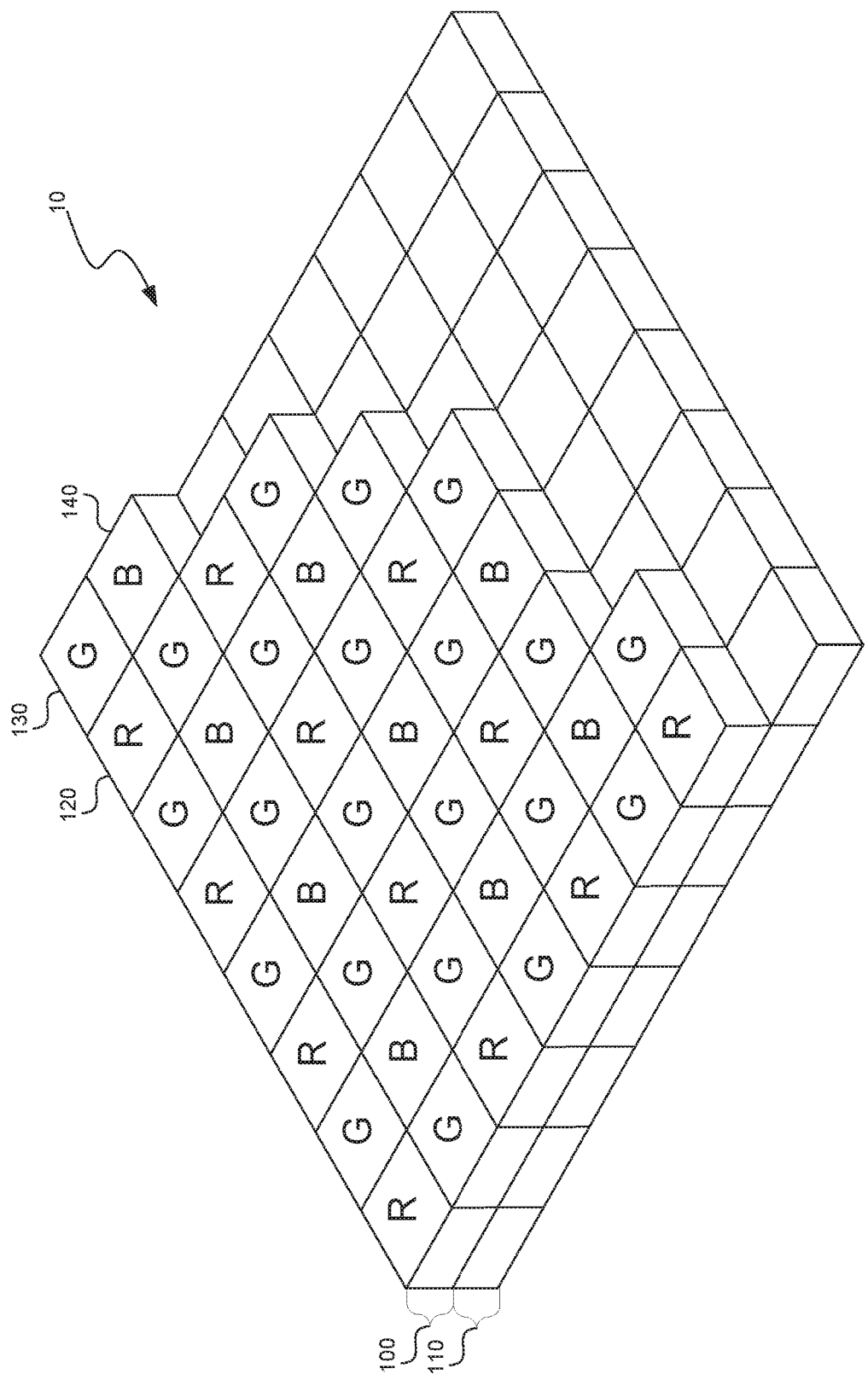
FIG. 1 shows an image sensor associated with an imaging device, according to one embodiment.

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others.

Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example, using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Technology

FIG. 1 shows an image sensor 10 associated with an imaging device, according to one embodiment. The image sensor 10 includes two layers: the color filter array 100, and the pixel sensor 110. The color filter array 100 includes a plurality of color filters. Each filter in the plurality of color filters allows only light of color corresponding to the color of the filter to reach the pixel sensor 110. The pixel sensor 110 includes a plurality of pixels. Each pixel in the plurality of pixels records the intensity of light reaching the pixel to produce a grayscale image. Each pixel in the grayscale image consists of a single scalar value representing the intensity of light reaching the pixel.

The plurality of color filters associated with the color filter array 100 can include a color set such as: red, green, blue; red, green, blue, emerald; cyan, yellow, magenta; cyan, yellow, green, magenta; red, green, blue, white; etc. The colors can be distributed within the color filter array 100 in a regular pattern, or an irregular pattern. The color filter array 100 shown in FIG. 1 includes a red filter 120, a green filter 130, and a blue filter 140. The color filters 120, 130, 140 in the color filter array 100 are distributed in a regular pattern, i.e., 2×2 square tiles across the color filter array 100. The shape of the color filter array 100 and the pixel sensor 110 correspond to each other, and can be planar, as shown in FIG. 1, or can be curved, such that the curvature associated with the color filter array 100, and the pixel sensor 110 correspond to the curvature of a sphere, an ellipsoid, a curvature of a lens associated with the imaging device, etc.

Figure 2:
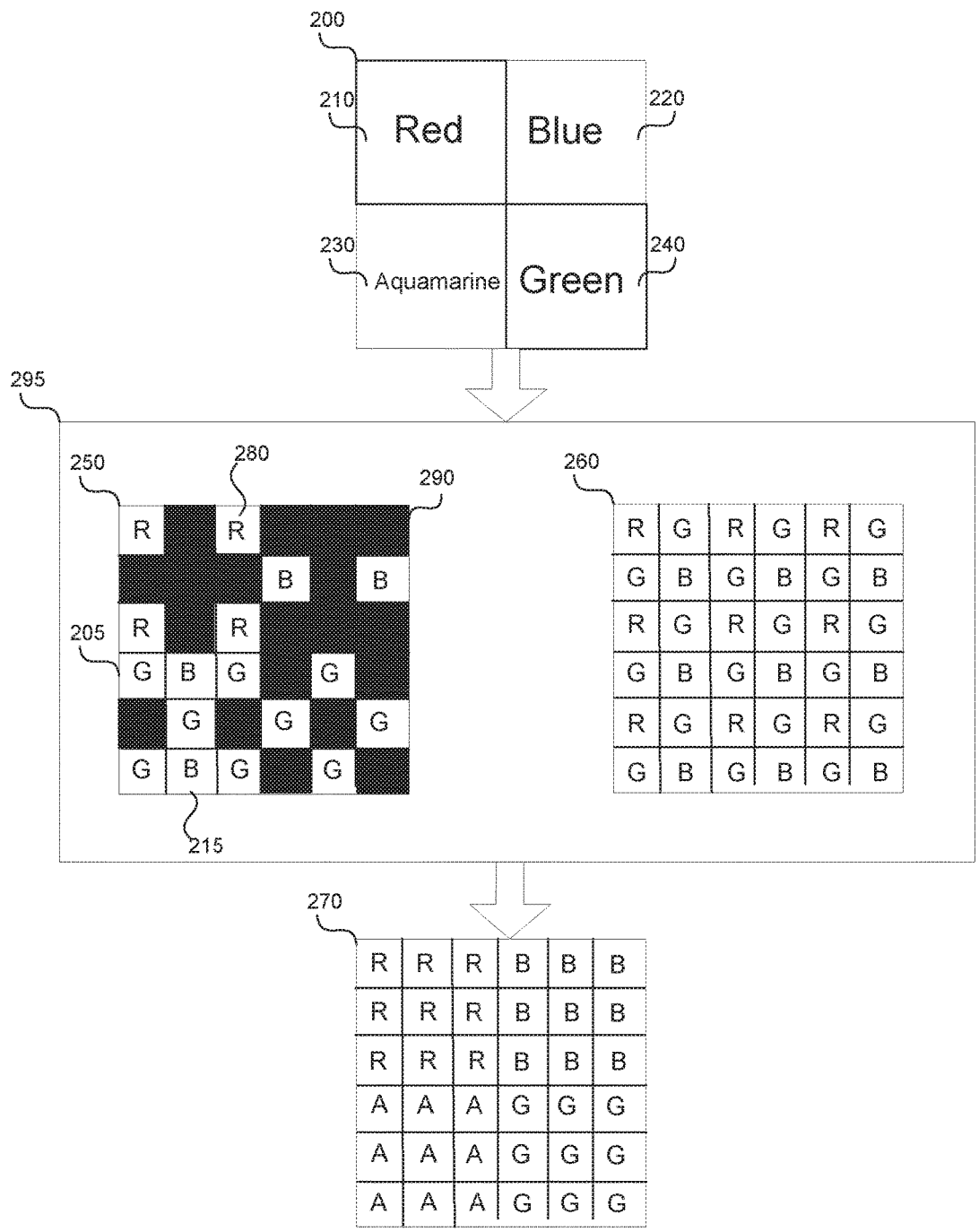
FIG. 2 shows a data flow of a process to record a real-world image with an imaging device, according to one embodiment.

FIG. 2 shows a data flow of a process to record a real-world image with an imaging device, according to one embodiment. For example, the real-world image 200 includes four color regions: region 210 is red, region 220 is blue, region 230 is aquamarine, which is a mix of green and blue, and region 240 is green.

An intermediate output 295 of recording the real-world image 200 includes the grayscale image 250 and the color designation 260. The grayscale image 250 shows the image recorded by the pixel sensor 110 in FIG. 1. The color designation 260 shows the color filters associated with the color filter array 100 in FIG. 1. Where the color in the real-world image 200 corresponds to a color in the color designation 260, the grayscale image 250 represents a grayscale value corresponding to the intensity of incoming light. Where the color in the real-world image 200 does not correspond to the color in the color designation 260, the grayscale image 250 includes a black pixel. For example, pixel 280 in the grayscale image 250 lacks information regarding light intensity associated with green and blue color, while pixel 290 lacks color information regarding light intensity associated with red and green color. Pixel 205 represents light intensity of the green component of the aquamarine region 230. Pixel 215 represents light intensity of the blue component of the aquamarine region 230.

Based on the intermediate output 295, a processor calculates a final color image 270. The final color image 270 includes color pixels. Each pixel consists of a tuple of values, such as (r, g, b). Each tuple has at least three colors. Each value in the tuple corresponds to a single color in the color designation 260. For example, in the tuple (r, g, b), r corresponds to red, g corresponds to green, and b corresponds to blue. The final color image 270 produced by the imaging device has the same resolution as the resolution of the grayscale image 250.

To produce the final color image 270, a processor associated with the image sensor reconstructs the missing color information for all the pixels associated with the grayscale image 250, such as pixels 280, 290. The processor can be mounted within the imaging device, or can be a remote processor connected via a computer bus, a wired network, or a wireless network to the imaging device. The process of reconstructing the color information is made more difficult when the pixels associated with the grayscale image are distorted, such as when different pixels associated with the grayscale image correspond to varying areas in the real-world. Such distortion can occur when a wide angle lens, and/or a fisheye lens, focuses incoming light on to the image sensor.

Figure 3A:
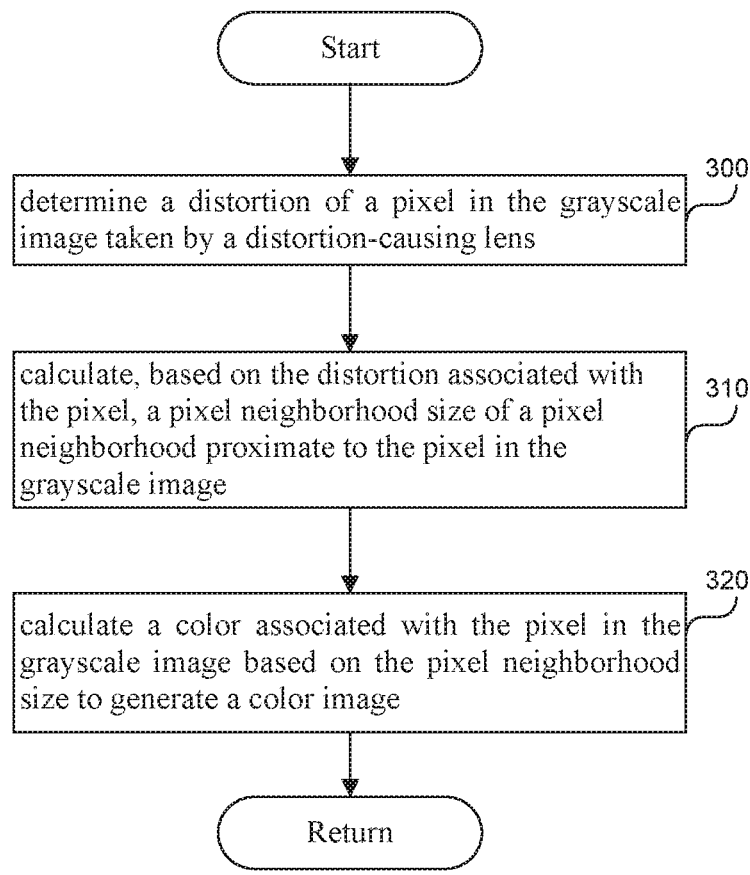
FIG. 3A is a flowchart of a method to calculate a color image from a grayscale image, according to one embodiment.

FIG. 3A is a flowchart of a method to calculate a color image from a grayscale image, according to one embodiment. In step 300, the processor determines a distortion of a pixel in the grayscale image taken through a distortion-causing lens, such as a wide-angle lens, fisheye lens, etc. The distortion can be determined based on a distortion model associated with the distortion-causing lens.

The distortion model can include calculating the distortion based on a distortion function and one or more input parameters to the distortion function. For example, the distortion function can be a distance between a center of the grayscale image and the pixel, and the input parameters can be the location of the center of the grayscale image and the location of the pixel. In another example, the distortion function can be a distance between one or more edges of the grayscale image and the pixel, and the input parameters can be the location of the one or more edges of the grayscale image, and the location of the pixel. In another example, the distortion function can take as an input a temperature associated with the distortion-causing lens.

The distortion model can also include determining a distortion mapping table associated with the distortion causing lens, and then accessing the distortion mapping table. The distortion mapping table includes per pixel distortion information. The distortion mapping table can be created at the time of manufacturing the imaging device, or can be created by the user when the imaging device is set to a distortion mapping mode. To create the distortion mapping table, the imaging device records a known real-world image, such as a Cartesian grid, to produce a distorted image. The imaging device can also store or generate the undistorted image, such as the Cartesian grid. The imaging device compares the undistorted image to the recorded distorted image and determines distortion associated with each pixel. The distortion can be recorded as a two-dimensional table of labels, such as high, medium, low, or number labels. Each entry in the two-dimensional table corresponds to a single pixel.

Further, the imaging device can store a plurality of distortion mapping tables, where each distortion mapping table corresponds to one or more input parameters. For example, the one or more input parameters can be a temperature associated with the distortion-causing lens. A lens can change shape based on the temperature, thus changing the distortion of the recorded image. Therefore, single lens can have various distortion tables depending on the temperature associated with the distortion-causing lens.

In step 310 of FIG. 3A, the processor calculates, based on the distortion associated with the pixel, a pixel neighborhood size of a pixel neighborhood proximate to the pixel in the grayscale image. The calculation includes negatively correlating the pixel neighborhood size to a magnitude of the distortion. In other words, the higher the distortion, the smaller the pixel neighborhood size, and the lower the distortion, the larger the pixel neighborhood size. The negative correlation between the pixel neighborhood size and the magnitude of the distortion can be inverse linear, inverse quadratic, inverse cubic, inverse exponential, etc.

In step 320 of FIG. 3A, the processor calculates a color associated with the pixel in the grayscale image, based on the pixel neighborhood size, to generate the color image. To calculate the color image, the processor obtains a color designation associated with each pixel in the grayscale image. The color designation can correspond to a color set such as: red, green, blue; red, green, blue, emerald; cyan, yellow, magenta; cyan, yellow, green, magenta; red, green, blue, white; etc.

The grayscale image can be an image comprising a plurality of pixels where each pixel corresponds to a single color associated with the color designation, such as the grayscale image 250 in FIG. 2. The grayscale image can be an image where the whole image corresponds to a single color associated with the color designation, such as the grayscale image comprises only red pixels, only green pixels, only blue pixels, etc. In this case, the processor obtains a plurality of grayscale images, where each image in the plurality of grayscale images corresponds to the single color associated with the color designation. For example, when the color designation comprises red, green, blue, as shown in FIG. 2, the processor can obtain 3 grayscale images comprising a grayscale image comprising only red pixels, a grayscale image comprising only green pixels, and a grayscale image comprising only blue pixels.

The color designation can be per pixel, per grayscale image, or per section of the grayscale image. In one embodiment, the processor can obtain the color designation by receiving a per pixel color such as the color designation 260 in FIG. 2. In another embodiment, the processor can obtain the color designation by receiving a color tile which is distributed in a regular pattern across the pixels associated with the grayscale image. The color tile in FIG. 2 is a 2×2 square comprising red and green in the first row, and green and blue in the second row. The color tile can be the color designation. In this case, the color designation is per section of the grayscale image. Alternatively, the processor can tile the grayscale image with the color tile to obtain the color designation associated with each pixel in the grayscale image. In this case, the color designation is per pixel. In yet another embodiment, the processor can obtain the color designation by receiving a plurality of images corresponding to the plurality of colors. So, the processor can receive a red grayscale image including only the red pixels, a green grayscale image including only the green pixels, and a blue grayscale image including only the blue pixels. In this case, the color designation is per grayscale image. For example, the color designation is red for the red grayscale image, green for the green grayscale image, and blue for the blue grayscale image. Based on the plurality of images, the processor can obtain the color designation associated with each pixel in the grayscale image.

To calculate the color image, the processor also assigns a weight to each pixel in the pixel neighborhood, such that a sum of weights associated with the pixel neighborhood does not exceed a constant number, such as one. For each pixel in the pixel neighborhood, the processor multiplies the color associated with each pixel by the weight to calculate an addend. Finally, the processor sums addends associated with the pixel neighborhood to calculate the color associated with the pixel.

The pixel neighborhood used to calculate a color associated with a pixel in the color image can be contiguous around the pixel associated with the grayscale image or it can be noncontiguous. The pixel neighborhood can be determined in various ways.

The pixel neighborhood can include pixels whose distance to the pixel associated with the grayscale image is within the calculated pixel neighborhood size. In this case, the resulting pixel neighborhood is contiguous.

The pixel neighborhood can also be determined such that the pixels in the pixel neighborhood do not cross any edges depicted in the grayscale image. To determine the pixel neighborhood, the processor first determines an edge depicted in the grayscale image. Second, the processor assigns pixels to the pixel neighborhood by checking whether a path between the pixel and a candidate pixel does not cross the edge depicted in the grayscale image, and whether a distance between the pixel and the candidate pixel is within the pixel neighborhood size.

The processor can determine the edge depicted in the grayscale image in various ways. For example, the processor can implement at least a two-pass process to determine the edge. First, the processor reconstructs colors across the grayscale image using a constant pixel neighborhood size to generate a temporary image. Second, within the temporary image, the processor determines edges using first-order or second-order differences between neighboring pixel colors. In this case, the resulting pixel neighborhood can be contiguous or can be noncontiguous.

Figure 3B:
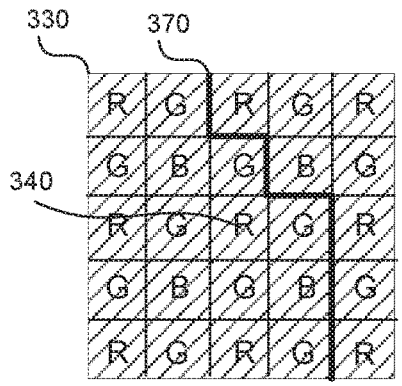
FIGS. 3B-3C show various edge-agnostic pixel neighborhoods, according to various embodiments.
Figure 3C:
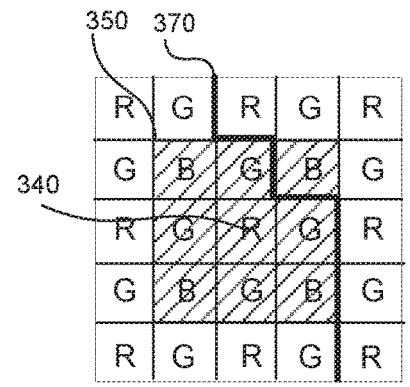

FIGS. 3B-3C show various edge-agnostic pixel neighborhoods, according to various embodiments. FIG. 3B shows a pixel neighborhood 330 surrounding a pixel 340, where the pixel neighborhood 330 is used to calculate the color image. The pixel neighborhood 330 has a pixel neighborhood size comprising a 5×5 grid of pixels surrounding the pixel 340. The pixel neighborhood 330 can be associated with an area where the distortion of the grayscale image is low. FIG. 3C shows the pixel neighborhood 350 surrounding the pixel 340. The pixel neighborhood 350 has a pixel neighborhood size comprising a 3×3 grid of pixels surrounding the pixel 340. The pixel neighborhood 350 can be associated with an area where the distortion of the grayscale image is higher than in FIG. 3B. The pixel neighborhoods 330, 350, do not take into account an edge 370, depicted in the grayscale image.

Figure 3D:
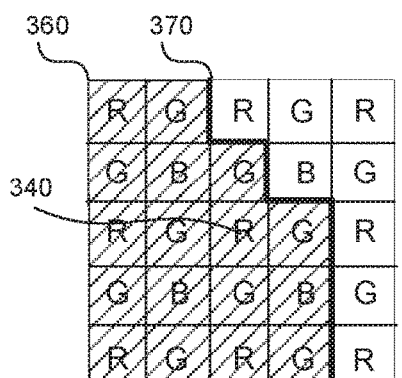
FIGS. 3D-3E show various pixel neighborhoods taking into account an edge depicted in the grayscale image, according to various embodiments.
Figure 3E:
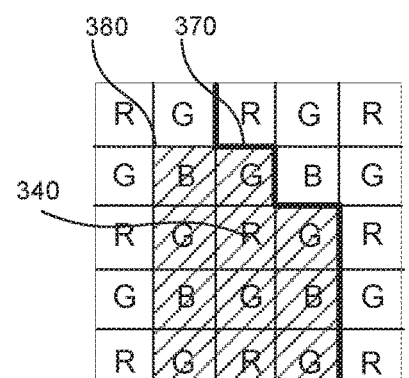

FIGS. 3D-3E show various pixel neighborhoods taking into account an edge depicted in the grayscale image, according to various embodiments. FIG. 3D shows a pixel neighborhood 360 surrounding the pixel 340, which takes position of the edge 370 into account. Pixel neighborhood 360 is constructed to not cross the edge 370. The pixel neighborhood 360 can be associated with an area where the distortion of the grayscale image is low. FIG. 3E shows a pixel neighborhood 380 surrounding the pixel 340, where the pixel neighborhood 380 does not cross the edge 370 depicted in the grayscale image. The pixel neighborhood 380 is associated with an area where the distortion of the grayscale image is higher than in FIG. 3D. Even though FIGS. 3B-3E show pixel neighborhoods 330, 350, 360, 380 projected onto a two-dimensional surface, the pixel neighborhoods shown in FIGS. 3B-3E can be projected onto a two-dimensional surface, a three-dimensional surface, a four-dimensional surface, etc.

Figure 4:
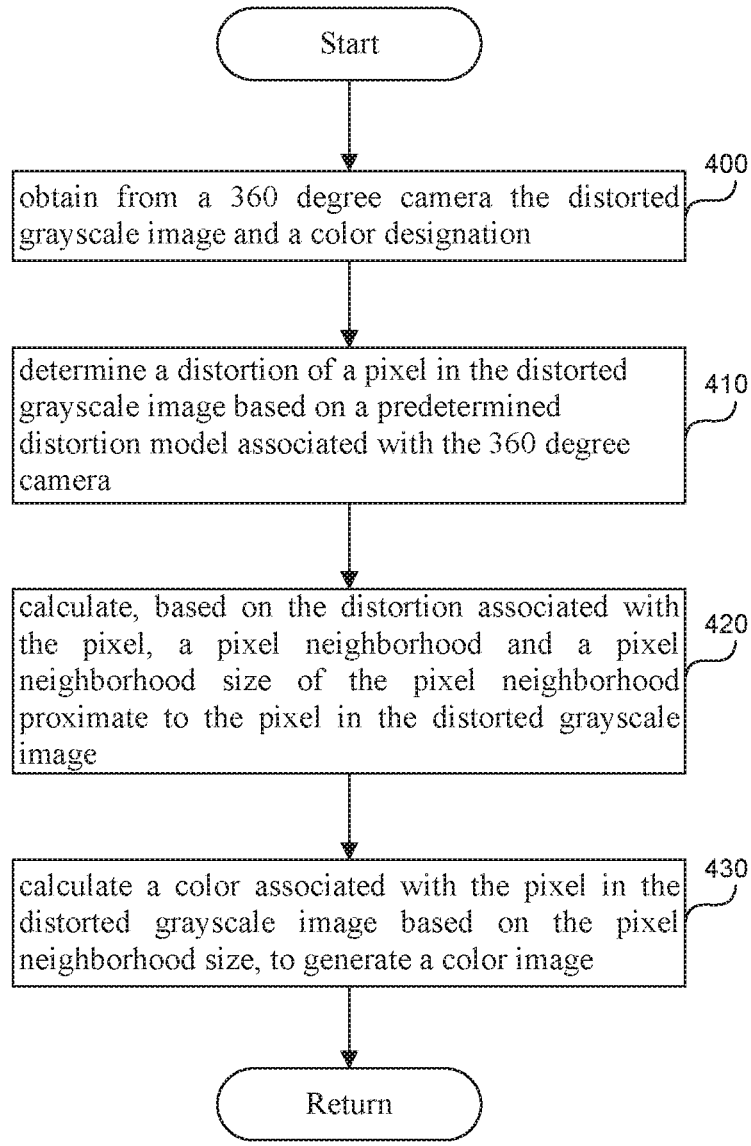
FIG. 4 is a flowchart of a method to reconstruct a color associated with a grayscale image across pixels lacking the color, according to one embodiment.

FIG. 4 is a flowchart of a method to reconstruct a color associated with a grayscale image across pixels lacking the color, according to one embodiment. In step 400, the processor obtains from a 360 degree camera the grayscale image and a color designation. The 360 degree camera can record 360 degree views of one or more of the yaw, pitch, and roll axes associated with a 360 degree time camera. Each pixel associated with the grayscale image comprises a grayscale value. The color designation associates the grayscale value with a single color in one of the following color sets: red, green, blue; red, green, blue, emerald; cyan, yellow, magenta; cyan, yellow, green, magenta; red, green, blue, white; etc.

In step 410, the processor determines a distortion of a pixel in the grayscale image based on a distortion model associated with the 360 degree camera. The distortion model can include a distortion mapping table, a distortion mapping function, etc., as described herein.

In step 420, the processor calculates, based on the distortion associated with the pixel, a pixel neighborhood and a pixel neighborhood size of the pixel neighborhood proximate to the pixel in the grayscale image. The calculation negatively correlates the pixel neighborhood size to a magnitude of the distortion. In other words, the higher the distortion, the smaller the pixel neighborhood size, and the lower the distortion, the larger the pixel neighborhood size. The negative correlation between the pixel neighborhood size and the magnitude of the distortion can be inverse linear, inverse quadratic, inverse cubic, inverse exponential, etc. The pixel neighborhood can be contiguous or noncontiguous, and can be calculated according to methods described herein, such as edge methods.

In step 430, the processor calculates a color associated with the pixel in the grayscale image based on the pixel neighborhood size, to generate a color image. A resolution associated with the color image is the same as the resolution associated with the grayscale image. Pixels in the color image can comprise one of the following color sets: red, green, blue; red, green, blue, emerald; cyan, yellow, magenta; cyan, yellow, green, magenta; red, green, blue, white; etc.

The operations described herein can be performed on a planar grayscale image, or on a grayscale image projected onto a three-dimensional surface, such as an ellipsoid, a cube, etc.

Figure 5:
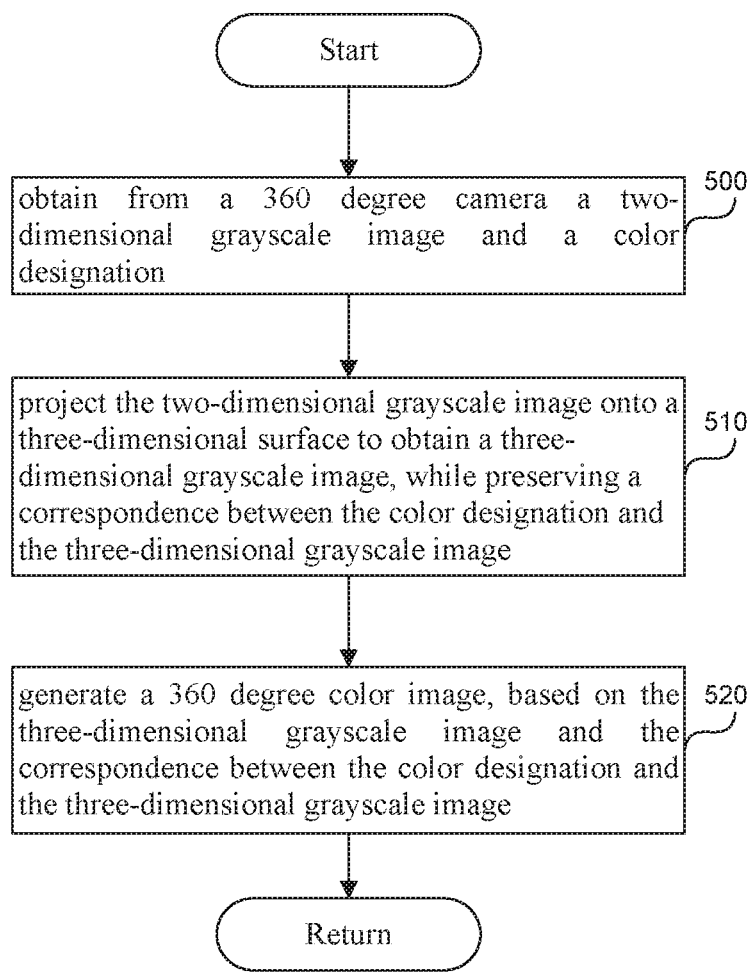
FIG. 5 is a flowchart of a method to generate a 360 degree color image, based on a two-dimensional grayscale image and a color designation, according to one embodiment.

FIG. 5 is a flowchart of a method to generate a 360 degree color image, based on a two-dimensional grayscale image and a color designation, according to one embodiment. In step 500, the processor obtains from a 360 degree camera a two-dimensional grayscale image and a color designation. The color designation specifies one or more colors associated with the two-dimensional grayscale image. The color designation can correspond to a color set such as: red, green, blue; red, green, blue, emerald; cyan, yellow, magenta; cyan, yellow, green, magenta; red, green, blue, white; etc.

The color designation can be per pixel, per two-dimensional grayscale image, or per section of the two-dimensional grayscale image. The two-dimensional grayscale image can be an image comprising a plurality of pixels where each pixel corresponds to a single color associated with the color designation, such as the grayscale image 250 in FIG. 2. In this case, the color designation is per pixel.

The color designation can be per two-dimensional grayscale image. The two-dimensional grayscale image can be an image where the whole image corresponds to a single color associated with the color designation, such as the two-dimensional grayscale image comprises only red pixels, only green pixels, only blue pixels, etc. In this case, the processor obtains a plurality of two-dimensional grayscale images, where each image in the plurality of two-dimensional grayscale images corresponds to the single color associated with the color designation. For example, when the color designation comprises red, green, blue, the processor obtains three two-dimensional grayscale images comprising a two-dimensional grayscale image comprising red pixels, a two-dimensional grayscale image comprising only green pixels, and a two-dimensional grayscale image comprising only blue pixels. In this case, the color designation is per two-dimensional grayscale image. For example, the color designation is red for the two-dimensional grayscale image comprising red pixels, green for the two-dimensional grayscale image comprising green pixels, and blue for two-dimensional grayscale image comprising pixels.

The color designation can be per section of the two-dimensional grayscale image. The processor can obtain the color designation by receiving a color tile which is distributed in a regular pattern across the pixels associated with the grayscale image. The color tile in FIG. 2 is a 2×2 square comprising red and green in the first row, and green and blue in the second row. The color tile can be the color designation. In this case, the color designation is per section of the two-dimensional grayscale image. Alternatively, the processor can tile the grayscale image with the color tile to obtain the color designation associated with each pixel in the grayscale image. In this case, the color designation is per pixel.

In step 510, the processor projects the two-dimensional grayscale image onto a three-dimensional surface to obtain a three-dimensional grayscale image, while preserving a correspondence between the color designation and the three-dimensional grayscale image. The three-dimensional surface can be an ellipsoid, a cube, a surface of a lens associated with the 360 degree camera, etc. Once the processor obtains the three-dimensional grayscale image, the processor can perform additional steps in the three-dimensional space, such as de-warping the image, correcting lens aberrations, stitching multiple three-dimensional grayscale images, etc.

The correspondence between the color designation and the three-dimensional grayscale image includes a transformation such that when the transformation is applied to a plurality of pixels in the two-dimensional grayscale image, a pixel in the three-dimensional grayscale image is generated. The transformation includes a plurality of weights corresponding to the plurality of pixels in the two-dimensional grayscale image, wherein the plurality of weights add up to a constant number, such as one.

The projection of the two-dimensional grayscale image onto the three-dimensional surface to obtain the three-dimensional grayscale image can be done while taking edges depicted in the two-dimensional grayscale image into account. According to one embodiment, the processor determines an edge depicted in the two-dimensional grayscale image. The processor then determines a transformation associated with a pixel in the three-dimensional grayscale image, and a plurality of pixels in the two-dimensional grayscale image to which to apply the transformation, such that the plurality of pixels in the two-dimensional grayscale image do not span the edge depicted in the two-dimensional grayscale image. The transformation includes a plurality of weights corresponding to the plurality of pixels in the two-dimensional grayscale image, wherein the plurality of weights add up to a constant number, such as one. Finally, the processor assigns the transformation to the correspondence between the color designation and the three-dimensional grayscale image.

In step 520 of FIG. 5, the processor generates a 360 degree color image, based on the three-dimensional grayscale image and the correspondence between the color designation and the three-dimensional grayscale image.

To generate the 360 degree color image, the processor can obtain the transformations applied to the two-dimensional grayscale image to obtain the three-dimensional grayscale image. The transformations can be retrieved from memory, or can be calculated as described herein. The transformations can take into account the edges depicted in the two-dimensional grayscale image, or the transformations can be edge-agnostic.

Figure 6:
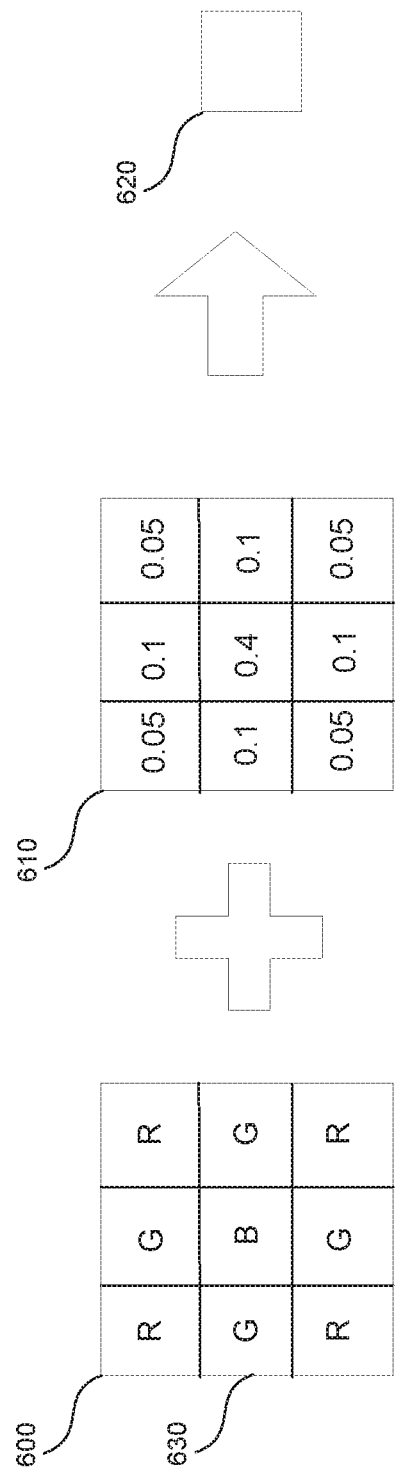
FIG. 6 shows a transformation applied to a two-dimensional grayscale image to obtain a three-dimensional grayscale image, according to one embodiment.

FIG. 6 shows a transformation applied to a two-dimensional grayscale image to obtain a three-dimensional grayscale image, according to one embodiment. The transformation 610 is applied to the plurality of pixels 600 associated with the two-dimensional grayscale image 630 to obtain the pixel 620 in the three-dimensional grayscale image. The transformation 610 includes a plurality of weights that add up to a constant number, such as one. Applying the transformation can involve multiplying a value associated with each pixel in the plurality of pixels 600 by the corresponding weight associated with the transformation 610.

Once the processor obtains the three-dimensional grayscale image, the processor needs to generate the 360 degree color image. Based on the plurality of weights associated with the transformation 610, the processor determines a color deficiency associated with the pixel 620 in the three-dimensional grayscale image. The color deficiency corresponds to each color in the color designation.

In FIG. 6, the value associated with the pixel 620 equals to 0.2*red+0.4*green+0.4*blue. Consequently, the color deficiency associated with the pixel 620 is 0.8 in red, 0.6 in green, and 0.6 in blue. Based on the color deficiency, the processor calculates a color associated with the pixel in the three-dimensional grayscale image. The processor can then use any of the methods described herein to reconstruct color across the pixels. The color reconstruction methods utilized in the grayscale image can be applied to a two-dimensional grayscale image, a three-dimensional grayscale image, etc.

The processor determines a new color of the pixel 620 using the color reconstruction methods described herein. The processor multiplies the red component of the new color by 0.8, the green component of the new color by 0.6, and the blue component of the new color by 0.6 to obtain a normalized new color. The processor also determines the red, green, and blue components of the result of applying the transformation 610 to the plurality of pixels 600. The processor then adds 0.2 of the red component, 0.4 of the green component, and 0.4 of the blue component of the result of applying the transformation 610 to the plurality of pixels 600, to the normalized new color. The result of the addition is a reconstructed color associated with the 360 degree color image.

To reconstruct color across the pixels in the three-dimensional grayscale image, the processor determines a distortion of a pixel in the three-dimensional grayscale image based on a distortion model associated with the 360 degree camera. The 360 degree camera can record 360 degree views of one or more of the yaw, pitch, and roll axes associated with a 360 degree time camera. The processor can determine the distortion of the pixel in various ways described herein. For example, the processor can access the distortion mapping table associated with the 360 degree camera. In another example, the processor can determine distortion by calculating the distortion based on a distance between the pixel and a center associated with the three-dimensional grayscale image.

The processor calculates, based on the distortion associated with the pixel, a pixel neighborhood size of a pixel neighborhood proximate to the pixel in the three-dimensional grayscale image. The processor calculates the pixel neighborhood size by negatively correlating the pixel neighborhood size to a magnitude of the distortion. In other words, the greater the distortion, the smaller the pixel neighborhood size, and the smaller the distortion, the greater the pixel neighborhood size.

To determine the pixel neighborhood, the processor can first determine an edge depicted in the three-dimensional grayscale image. Second, the processor determines the pixel neighborhood such that a path between the pixel and each pixel associated with the pixel neighborhood does not cross the edge depicted in the three-dimensional grayscale image, and a distance between the pixel and each pixel associated with the pixel neighborhood is within the pixel neighborhood size.

The processor calculates a color associated with the pixel in the three-dimensional grayscale image based on the pixel neighborhood size and the pixel neighborhood, to generate the 360 degree color image. To calculate the color associated with the pixel in the three-dimensional image, the processor can, for each pixel in the pixel neighborhood, assign a weight to each pixel, such that a sum of weights associated with the pixel neighborhood does not exceed a constant number, such as one. For each pixel in the pixel neighborhood, the processor multiplies the color associated with each pixel by the weight to obtain an addend. Finally, the processor sums addends associated with the pixel neighborhood to calculate the color associated with the pixel.

Figure 7A:
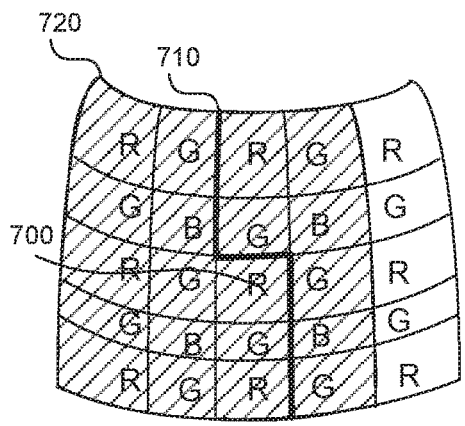
FIGS. 7A-7B show various edge-agnostic pixel neighborhoods, according to various embodiments.
Figure 7B:
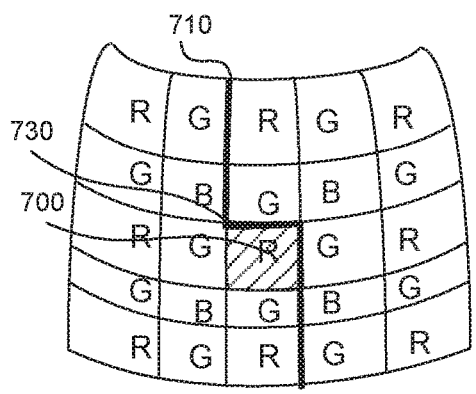

FIGS. 7A-7B show various edge-agnostic pixel neighborhoods, according to various embodiments. The pixel neighborhoods 720, 730 are defined on a three-dimensional surface, such as a sphere. However, the pixel neighborhoods 720, 730 can be defined on a two-dimensional surface, four-dimensional surface, etc. FIG. 7A shows a pixel neighborhood 720 surrounding a pixel 700, where the pixel neighborhood 720 is used to calculate the color image, such as the 360 degree color image. The pixel neighborhood 720 has a pixel neighborhood size comprising a 5×4 grid of pixels surrounding the pixel 700. The pixel neighborhood 720 can be associated with an area where the distortion of the grayscale image is low. FIG. 7B shows the pixel neighborhood 730 surrounding the pixel 700. The pixel neighborhood 730 has a pixel neighborhood size comprising the pixel 700. The pixel neighborhood 730 can be associated with an area where the distortion of the grayscale image is higher than in FIG. 7A. The pixel neighborhoods 720, 730, do not take into account an edge 710, depicted in the three-dimensional grayscale image.

Figure 7C:
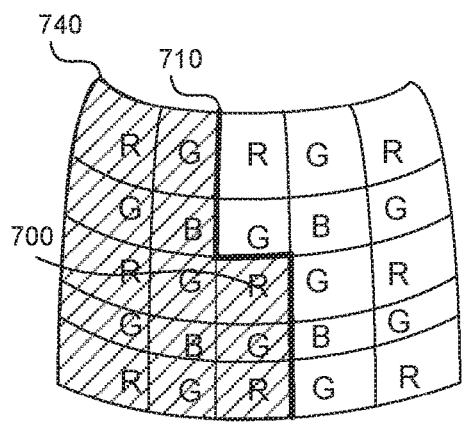
FIGS. 7C-7D show various pixel neighborhoods taking into account an edge depicted in the three-dimensional grayscale image, according to various embodiments.
Figure 7D:
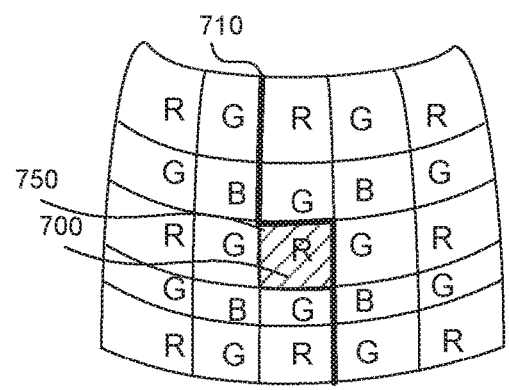

FIGS. 7C-7D show various pixel neighborhoods, taking into account an edge depicted in the three-dimensional grayscale image, according to various embodiments. The pixel neighborhoods 740, 750 are defined on a three-dimensional surface, such as a sphere; however, the pixel neighborhoods 740, 750, can be defined on a two-dimensional surface, four-dimensional surface, etc. FIG. 7C shows a pixel neighborhood 740 surrounding the pixel 700, which takes the position of the edge 710, into account. The pixel neighborhood 740 is constructed to not cross the edge 710. The pixel neighborhood 740 can be associated with an area where the distortion of the grayscale image is low. FIG. 7D shows a pixel neighborhood 750 surrounding the pixel 700, where the pixel neighborhood 750 does not cross the edge 710 depicted in the grayscale image. The pixel neighborhood 750 is associated with an area where the distortion of the grayscale image is higher than in FIG. 7C. Even though FIGS. 7A-7D show pixel neighborhoods 720, 730, 740, 750 projected onto a three-dimensional surface, the pixel neighborhoods shown in FIGS. 7A-7D can be projected onto a two-dimensional surface, a three-dimensional surface, a four-dimensional surface, etc.

Figure 8:
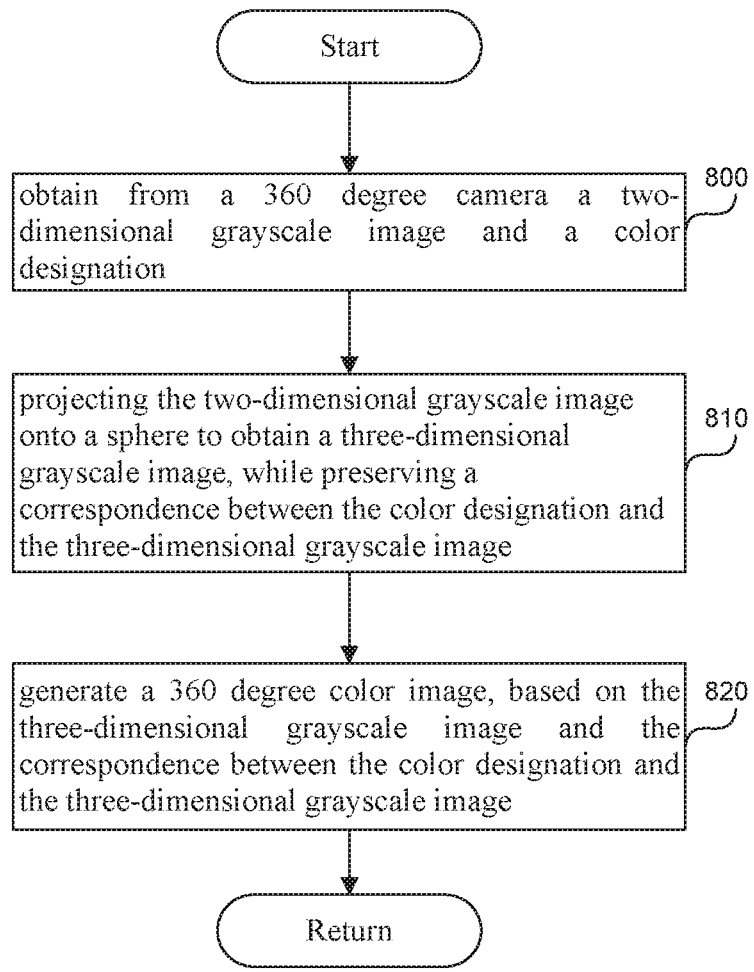
FIG. 8 is a flowchart of a method to generate a 360 degree color image, based on a two-dimensional grayscale image and a color designation, according to one embodiment.

FIG. 8 is a flowchart of a method to generate a 360 degree color image, based on a two-dimensional grayscale image and a color designation, according to one embodiment. In step 800, the processor obtains from a 360 degree camera the two-dimensional grayscale image, as described herein, and the color designation, as described herein. The color designation specifies one or more colors associated with the two-dimensional grayscale image.

In step 810, the processor projects the two-dimensional grayscale image onto a sphere to obtain a three-dimensional grayscale image, while preserving a correspondence between the color designation and the three-dimensional grayscale image. The projection can be performed using any of the methods described herein. The correspondence between the color designation and the three-dimensional grayscale image comprises a transformation, as described herein, such that when the transformation is applied to a plurality of pixels in the two-dimensional grayscale image, a pixel in the three-dimensional grayscale image is generated. The transformation comprises a plurality of weights corresponding to the plurality of pixels in the two-dimensional grayscale image, wherein the plurality of weights add up to a constant number, such as one.

In step 820, based on the three-dimensional grayscale image and the correspondence between the color designation and the three-dimensional grayscale image, the processor generates the 360 degree color image. The processor can generate the 360 degree color image using any of the methods described herein.

For example, to generate the 360 degree color image, the processor determines a distortion of the pixel in the three-dimensional grayscale image based on a distortion model associated with the 360 degree camera. The processor calculates, based on the distortion associated with the pixel, a pixel neighborhood size of a pixel neighborhood proximate to the pixel in the three-dimensional grayscale image. The calculation negatively correlates neighborhood size to a magnitude of the distortion. The processor calculates a color associated with the pixel in the three-dimensional grayscale image based on the pixel neighborhood size, to generate the 360 color image.

Methods described herein can be implemented in various systems comprising a programmable processor, such as a microprocessor, microcontroller, system-on-a-chip, etc.

Computer

Figure 9:
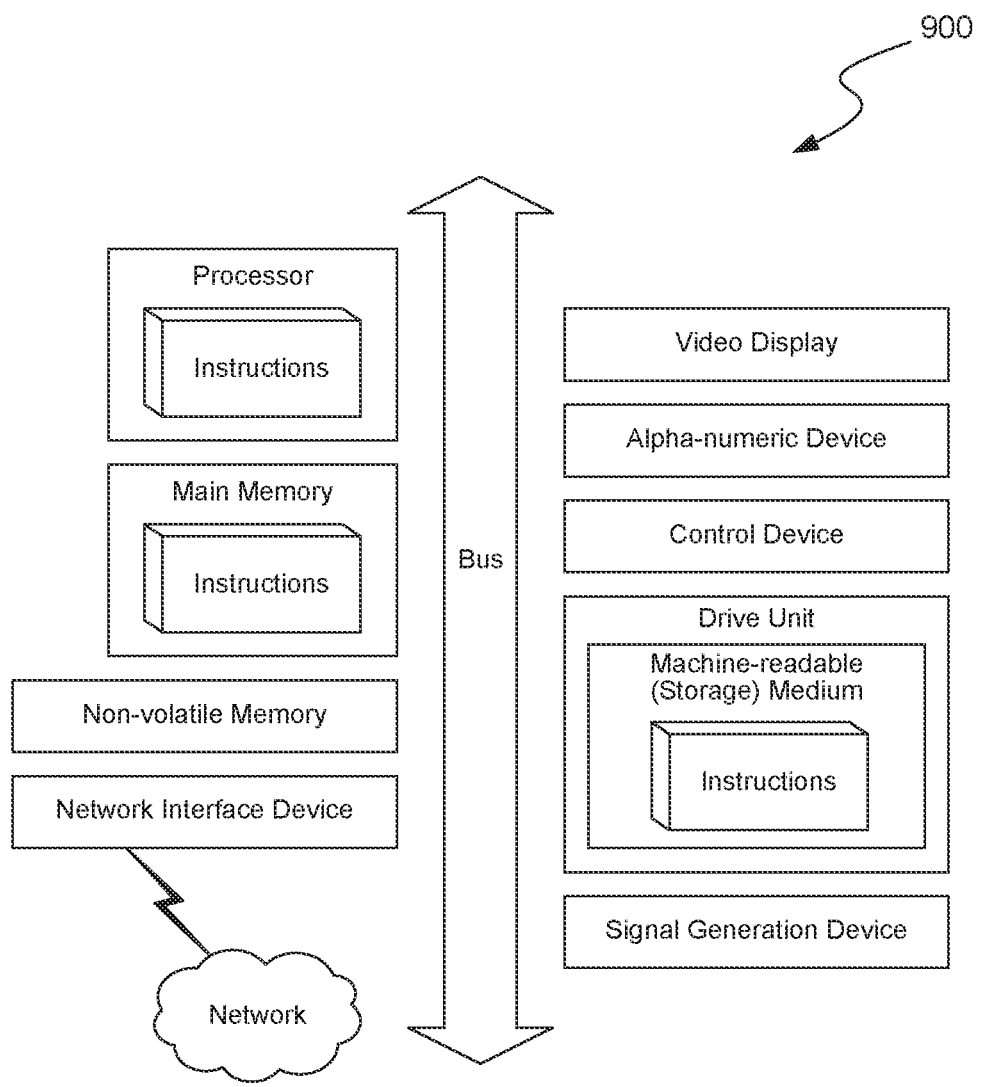
FIG. 9 is a diagrammatic representation of a machine in the example form of a computer system within which a set of instructions, for causing the machine to perform any one or more of the methodologies or modules discussed herein, may be executed.

FIG. 9 is a diagrammatic representation of a machine in the example form of a computer system 900 within which a set of instructions, for causing the machine to perform any one or more of the methodologies or modules discussed herein, may be executed.

In the example of FIG. 9, the computer system 900 includes a processor, a memory, a non-volatile memory, and an interface device. Various common components (e.g., cache memory) are omitted for illustrative simplicity. The computer system 900 is intended to illustrate a hardware device on which any of the components described in the example of FIGS. 1-8 (and any other components described in this specification) can be implemented. The computer system 900 can be of any applicable known or convenient type. The components of the computer system 900 can be coupled together via a bus or through some other known or convenient device.

This disclosure contemplates the computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 900 may include one or more computer systems 900; be unitary or distributed; span multiple locations; span multiple machines; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform, in real time or in batch mode, one or more steps of one or more methods described or illustrated herein. One or more computer systems 900 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 900. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 900. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 9 reside in the interface.

In operation, the computer system 900 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The terms "machine-readable medium" and "machine-readable storage medium" shall also be taken to include any medium that is capable of storing, encoding, or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method to generate a 360 degree color image in a spherical space, based on a two-dimensional grayscale image and a color designation comprising:
   obtaining from a 360 degree camera the two-dimensional grayscale image and the color designation, wherein the color designation specifies one or more colors associated with the two-dimensional grayscale image;
   mapping the two-dimensional grayscale image onto a representation of a sphere to obtain a three-dimensional grayscale image, while preserving a correspondence between the color designation and the three-dimensional grayscale image, said projecting comprising:
      applying a transformation to a plurality of pixels in the two-dimensional grayscale image to generate a pixel in the three-dimensional grayscale image, wherein the transformation comprises a plurality of weights corresponding to the plurality of pixels in the two-dimensional grayscale image, wherein the plurality of weights add up to a constant number;
      storing the transformation to preserve the correspondence between the color designation and the 3-dimensional grayscale image; and
   based on the three-dimensional grayscale image and the correspondence between the color designation and the three-dimensional grayscale image, generating the 360 degree color image.

2. The method of claim 1, said generating the 360 degree color image comprising:
   determining a distortion of the pixel in the three-dimensional grayscale image based on a distortion model associated with the 360 degree camera;
   calculating, based on the distortion associated with the pixel, a pixel neighborhood size of a pixel neighborhood proximate to the pixel in the three-dimensional grayscale image, wherein said calculating includes negatively correlating the pixel neighborhood size to a magnitude of the distortion; and
   calculating a color associated with the pixel in the three-dimensional grayscale image based on the pixel neighborhood size, to generate the 360 color image.

3. A method comprising:
   obtaining from a 360 degree camera a two-dimensional grayscale image and a color designation, wherein the color designation specifies one or more colors associated with the two-dimensional grayscale image;
   mapping the two-dimensional grayscale image onto a representation of a three-dimensional surface to obtain a three-dimensional grayscale image, while preserving a correspondence between the color designation and the three-dimensional grayscale image; and
   based on the three-dimensional grayscale image and the correspondence between the color designation and the three-dimensional grayscale image, generating a 360 degree color image.

4. The method of claim 3, wherein the correspondence between the color designation and the three-dimensional grayscale image comprises a transformation such that when the transformation is applied to a plurality of pixels in the two-dimensional grayscale image, a pixel in the three-dimensional grayscale image is generated.

5. The method of claim 4, wherein the transformation comprises a plurality of weights corresponding to the plurality of pixels in the two-dimensional grayscale image, wherein the plurality of weights add up to a constant number.

6. The method of claim 5, said generating the 360 degree color image comprising:
   based on the plurality of weights associated with the transformation, determining a color deficiency associated with the pixel in the three-dimensional grayscale image, wherein the color deficiency corresponds to each color in the color designation; and
   based on the color deficiency, calculating a color associated with the pixel in the three-dimensional grayscale image.

7. The method of claim 3, said projecting the two-dimensional grayscale image onto the three-dimensional surface to obtain the three-dimensional grayscale image, while preserving the correspondence between the color designation and the three-dimensional grayscale image comprising:
   determining an edge depicted in the two-dimensional grayscale image;
   determining a transformation associated with a pixel in the three-dimensional grayscale image, and a plurality of pixels in the two-dimensional grayscale image to which to apply the transformation, such that the plurality of pixels in the two-dimensional grayscale image do not span the edge depicted in the two-dimensional grayscale image; and
   assigning the transformation to the correspondence between the color designation and the three-dimensional grayscale image.

8. The method of claim 7, wherein the transformation comprises a plurality of weights corresponding to the plurality of pixels in the two-dimensional grayscale image, wherein the plurality of weights add up to a constant number.

9. The method of claim 8, said generating the 360 degree color image comprising:
   based on the plurality of weights associated with the transformation, determining a color deficiency associated with the pixel in the three-dimensional grayscale image, wherein the color deficiency corresponds to each color in the color designation; and
   based on the color deficiency, calculating a color associated with the pixel in the three-dimensional grayscale image.

10. The method of claim 3, wherein the three-dimensional surface corresponds to a surface of a lens associated with the 360 degree camera.

11. The method of claim 3, wherein the three-dimensional surface comprises an ellipsoid.

12. The method of claim 3, said generating the 360 degree color image comprising:
   determining a distortion of a pixel in the three-dimensional grayscale image based on a distortion model associated with the 360 degree camera;
   calculating, based on the distortion associated with the pixel, a pixel neighborhood size of a pixel neighborhood proximate to the pixel in the three-dimensional grayscale image, wherein said calculating includes negatively correlating the pixel neighborhood size to a magnitude of the distortion; and
   calculating a color associated with the pixel in the three-dimensional grayscale image based on the pixel neighborhood size, to generate the 360 degree color image.

13. The method of claim 12, wherein determining the distortion comprises calculating the distortion based on a distance between the pixel and a center associated with the three-dimensional grayscale image.

14. The method of claim 12, wherein determining the distortion comprises accessing a distortion mapping table associated with the 360 degree camera.

15. The method of claim 12, further comprising:
determining an edge depicted in the three-dimensional grayscale image; and
determining the pixel neighborhood such that a path between the pixel and each pixel associated with the pixel neighborhood does not cross the edge depicted in the three-dimensional grayscale image, and a distance between the pixel and each pixel associated with the pixel neighborhood is within the pixel neighborhood size.

16. The method of claim 15, said calculating the color associated with the pixel comprising:
for each pixel in the pixel neighborhood, assigning a weight to each pixel, such that a sum of weights associated with the pixel neighborhood does not exceed a constant number;
for each pixel in the pixel neighborhood, multiplying the color associated with each pixel by the weight to obtain an addend; and
summing addends associated with the pixel neighborhood to calculate the color associated with the pixel.

17. A system to generate a 360 degree color image in a spherical space, based on a two-dimensional grayscale image and a color designation comprising:
a 360 degree camera comprising a plurality of lenses, the 360 degree camera to record the 360 degree color image;
a processor disposed within the 360 degree camera;
a storage medium storing computer-executable instructions that, when executed by the processor, cause the system to perform a computer-implemented operation, the instructions comprising:
instructions for obtaining from the 360 degree camera the two-dimensional grayscale image and the color designation, wherein the color designation specifies one or more colors associated with the two-dimensional grayscale image;
instructions for mapping the two-dimensional grayscale image onto a representation of a sphere to obtain a three-dimensional grayscale image, while preserving a correspondence between the color designation and the three-dimensional grayscale image, wherein the correspondence between the color designation and the three-dimensional grayscale image comprises a transformation such that when the transformation is applied to a plurality of pixels in the two-dimensional grayscale image, a pixel in the three-dimensional grayscale image is generated, wherein the transformation comprises a plurality of weights corresponding to the plurality of pixels in the two-dimensional grayscale image, wherein the plurality of weights add up to a constant number;
based on the three-dimensional grayscale image and the correspondence between the color designation and the three-dimensional grayscale image, instructions for generating the 360 degree color image.

18. The system of claim 17, said instructions for generating the 360 degree color image comprising instructions for:
determining a distortion of the pixel in the three-dimensional grayscale image based on a distortion model associated with the 360 degree camera;
calculating, based on the distortion associated with the pixel, a pixel neighborhood size of a pixel neighborhood proximate to the pixel in the three-dimensional grayscale image, wherein said calculating includes negatively correlating the pixel neighborhood size to a magnitude of the distortion; and
calculating a color associated with the pixel in the three-dimensional grayscale image based on the pixel neighborhood size, to generate the 360 degree color image.

19. A system comprising:
an imaging device to generate a color image;
a processor coupled to the imaging device;
a storage medium storing computer-executable instructions that, when executed by the processor, cause the system to perform a computer-implemented operation, the instructions comprising:
instructions for obtaining from the imaging device a two-dimensional grayscale image and a color designation, wherein the color designation specifies one or more colors associated with the two-dimensional grayscale image;
instructions for mapping the two-dimensional grayscale image onto a representation of a three-dimensional surface to obtain a three-dimensional grayscale image, while preserving a correspondence between the color designation and the three-dimensional grayscale image; and
based on the three-dimensional grayscale image and the correspondence between the color designation and the three-dimensional grayscale image, instructions for generating the color image.

20. The system of claim 19, the imaging device comprising:
a lens focusing incoming light to a curved image sensor; and
the curved image sensor to record the two-dimensional grayscale image, wherein a curvature associated with the curved image sensor corresponds to a curvature associated with the lens.

21. The system of claim 19, wherein the correspondence between the color designation and the three-dimensional grayscale image comprises a transformation such that when the transformation is applied to a plurality of pixels in the two-dimensional grayscale image, a pixel in the three-dimensional grayscale image is generated.

22. The system of claim 21, wherein the transformation comprises a plurality of weights corresponding to the plurality of pixels in the two-dimensional grayscale image, wherein the plurality of weights add up to a constant number.

23. The system of claim 22, said instructions for generating the color image comprise instructions for:
based on the plurality of weights associated with the transformation, determining a color deficiency associated with the pixel in the three-dimensional grayscale image, wherein the color deficiency corresponds to each color in the color designation; and
based on the color deficiency, calculating a color associated with the pixel in the three-dimensional grayscale image.

24. The system of claim 19, said instructions for projecting the two-dimensional grayscale image onto the three-dimensional surface to obtain the three-dimensional grayscale image, while preserving the correspondence between the color designation and the three-dimensional grayscale image comprise instructions for:

determining an edge depicted in the two-dimensional grayscale image;

determining a transformation associated with a pixel in the three-dimensional grayscale image, and a plurality of pixels in the two-dimensional grayscale image to which to apply the transformation, such that the plurality of pixels in the two-dimensional grayscale image do not span the edge depicted in the two-dimensional grayscale image; and assigning the transformation to the correspondence between the color designation and the three-dimensional grayscale image.

25. The system of claim 24, wherein the transformation comprises a plurality of weights corresponding to the plurality of pixels in the two-dimensional grayscale image, wherein the plurality of weights add up to a constant number.

26. The system of claim 19, wherein the three-dimensional surface corresponds to a surface of a lens associated with the imaging device.

27. The system of claim 19, said instructions for generating the color image comprise instructions for:

determining a distortion of a pixel in the three-dimensional grayscale image based on a distortion model associated with the imaging device;

calculating, based on the distortion associated with the pixel, a pixel neighborhood size of a pixel neighborhood proximate to the pixel in the three-dimensional grayscale image, wherein said calculating includes negatively correlating the pixel neighborhood size to a magnitude of the distortion; and calculating a color associated with the pixel in the three-dimensional grayscale image based on the pixel neighborhood size, to generate the color image.

28. The system of claim 27, wherein instructions for determining the distortion comprise instructions for calculating the distortion based on a distance between the pixel and a center associated with the three-dimensional grayscale image.

29. The system of claim 27, wherein instructions for determining the distortion comprise instructions for accessing a distortion mapping table associated with the imaging device.

30. The system of claim 27, further comprising instructions for:

determining an edge depicted in the three-dimensional grayscale image; and determining the pixel neighborhood such that a path between the pixel and each pixel associated with the pixel neighborhood does not cross the edge depicted in the three-dimensional grayscale image, and a distance between the pixel and each pixel associated with the pixel neighborhood is within the pixel neighborhood size.

* * * * *